July 14, 1953  J. E. DRAPEAU, JR., ET AL  2,645,573
PROCESS FOR PRODUCING BRASS POWDER
Filed July 24, 1946

Joseph E. Drapeau, Jr.
Nathan B. Barber, Jr.
INVENTORS

BY Charles E. Carney
ATT'Y.

Patented July 14, 1953

2,645,573

UNITED STATES PATENT OFFICE 2,645,573

PROCESS FOR PRODUCING BRASS POWDER

Joseph E. Drapeau, Jr., Calumet City, and Nathan B. Barber, Jr., Chicago, Ill.; said Drapeau, Jr., assignor to The Glidden Company, Cleveland, Ohio, a corporation of Ohio Application July 24, 1946, Serial No. 685,794

2 Claims. (Cl. 75—.5)

This invention relates to a process for producing brass powder by reducing zinc oxide with gaseous reducing agents at elevated temperatures in the presence of metallic copper, and also relates to an extended process of like character by means of which brass-containing material, and mixtures of brass with zinc, zinc oxide and/or copper may be converted to brass powder.

We have found that while zinc oxide cannot be commercially reduced to metallic zinc powder by means of hydrogen, carbon monoxide, or their mixtures at temperatures around 1400° F. to 1550° F., it can be reduced at these temperatures by such reducing agents in the presence of metallic copper, with the result that brass powder is produced. We have also found that if such a reduction is relied on to produce brass powder, the metallic copper whose presence is essential to the process may be formed in situ by the reduction of oxidic compounds of copper, such as copper oxides, hydroxides, carbonates or basic carbonates. By reason of this latter discovery, we are able to employ a leaching process as a means for obtaining a mixture of zinc oxide and copper oxide which can be made suitable for reduction into brass powder. Moreover, since such a leaching process is suitable, we are able to use scrap brass, zinc and copper as raw materials from which the copper and zinc components of the brass powder are derived. Accordingly, by means of this invention it becomes possible to treat secondary or scrap brass by an economical and efficient process to convert the same into a relatively valuable brass powder which is eminently suited for fabrication into a variety of machine parts or elements by well-known powder metallurgical processes.

Accordingly, it is an object of this invention to convert brass or scrap brass into brass powder.

It is another object of the invention to produce brass powder by a thermal reduction of zinc oxide in the presence of metallic copper.

It is a further object to treat prime or secondary copper, zinc and brass by hydro-metallurgical means to produce a mixture of oxidic zinc and copper compounds which can be treated by thermal reduction methods to produce brass powder.

These and other objects will be apparent from the following description, taken in conjunction with the accompanying drawings in which.

Figure 1:
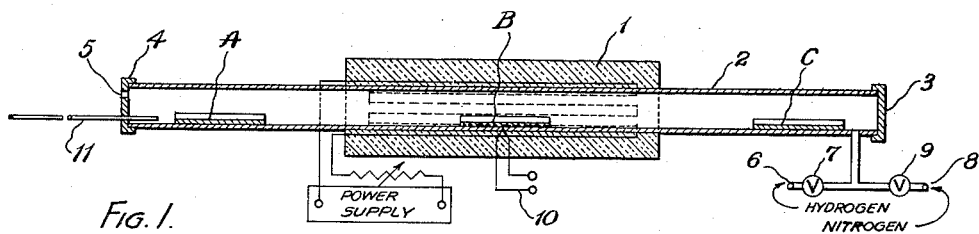
Figure 1 is a diagrammatic representation of a muffle furnace suitable for use in effecting the reduction of mixed oxidic zinc and copper compounds to produce brass powder.

This invention is based in part on our discovery that zinc oxide can be reduced by means of gaseous reducing agents at relatively low temperatures if metallic copper in finely-divided form is intimately dispersed throughout the zinc oxide. We have found that the reduction temperatures are high enough to permit the reduced zinc to be absorbed rapidly by the copper to form brass particles, yet are low enough to avoid appreciable losses of zinc by vaporization. The reduction also avoids any appreciable agglomeration of the brass powder into coarse lumps or masses, with the result that the brass particles are recovered in finely-divided form, and a simple milling operation is all that is required to convert them into soft, easily-compressible powders of desired fineness.

The invention is based in further part on our discovery that when a mixture of oxidic zinc compounds with oxidic copper compounds is subjected to reduction by means of hydrogen, carbon monoxide or their mixtures, the copper compounds can be reduced practically completely before any appreciable reduction of zinc oxide begins. Accordingly, the reduction of such a mixture naturally occurs in such sequence that finely divided porous metallic copper is provided in the charge by the time its presence is needed to promote the reduction of the zinc oxide. It will be understood, of course, that a co-reduction of a mixture of zinc oxide and oxidic copper compounds is not required, since the production of brass powder in accordance with the invention can be achieved equally well by mixing metallic copper powder with zinc oxide or oxidic zinc compounds and subjecting this mixture to reduction. Nevertheless, a co-reduction of the mixed oxidic compounds is advantageous in that it permits one to produce the finely divided copper in situ in a porous condition, and to employ metallic brass as the raw material from which the zinc and copper constituents of the desired brass powder may be obtained. That is, we have found that metallic brass can be subjected to a leaching treatment with ammonium carbonate solutions whereby the zinc and copper of the brass may be dissolved. The resulting solution may then be treated in a simple manner to precipitate the zinc and copper thereof in the form of oxidic zinc and copper compounds. This oxidic precipitate may then be dried, its composition adjusted to produce a brass powder of desired composition, finely ground, and then subjected to thermal reduction to produce the desired brass powder. By employing such a process, and by using secondary or scrap brass as the raw material, a relatively cheap raw material may be converted economically into a brass powder of considerable value and marketability. It will be recognized, however, that the invention may be practised in its broadest aspects without employing such a leaching process, since zinc oxide and oxidic zinc compounds from any source may be mixed with either copper powder or oxidic copper compounds from any suitable sources, and the mixture reduced thermally in accordance with the invention to produce brass powder. Nevertheless, there are obvious economic advantages in a process which employs secondary brass rather than prime zinc oxide and copper oxide as the raw material.

The foregoing aspects of the invention may now be more fully explained in connection with specific examples which illustrate, but do not limit, the various features of the invention.

REDUCTION

Example I

Commercial copper oxide of mesh size finer than about 80 mesh was intimately mixed with finely ground zinc oxide of particle size substantially less than 10 microns. The mixing was very carefully and thoroughly performed to ensure a uniform distribution of the zinc oxide throughout the mixture. The proportions were such as to provide a copper-to-zinc ratio of about 70:30. Different batches of the mixture were then subjected to reduction in a muffle furnace of the type illustrated diagrammatically in Figure 1.

The furnace consisted of a thermally insulated electric resistance heating unit 1 surrounding an elongated muffle tube 2 about one inch in diameter composed of silica or chrome-nickel steel. The muffle was closed at one end by a cap 3 and partially closed at the other end by a cap 4 having an exhaust port 5 in it. Hydrogen could be admitted to the muffle through inlet 6 provided with valve 7, while nitrogen could be admitted through inlet 8 provided with valve 9. Temperature measurements were made by means of thermocouple 10 secured in the wall of the muffle tube in the hottest portion thereof. In each case the batch of mixture to be reduced was spread out in a tray to form a uniform layer of the thickness indicated in the following table. The procedure of handling each tray then consisted in flushing the muffle out with hydrogen while adjusting the electric input of the heating unit to establish the desired temperature as measured by the thermocouple. The flow of hydrogen was stabilized at about 6 cubic feet per minute measured at room temperature after which the tray was put into the muffle at position A and allowed to remain there a few minutes. It was then pushed as by rod 11 into the hot zone of the muffle, as at position B, and allowed to remain in that position for the time indicated in the table. It was then pushed to position C where it was allowed to cool. After the tray and its contents had cooled to about room temperature, valve 7 was closed and valve 9 was opened, thus allowing nitrogen to enter the muffle, and to flush out the hydrogen. Cap 3 was then removed, and the tray with its layer of charge was taken from the muffle and examined. Meanwhile another tray had been inserted in the muffle at position A.

TABLE I

| Time (min.) | Temp. (° F.) | Layer Thickness (Inches) | Reduced Powder Analysis | | Remarks |
|---|---|---|---|---|---|
| | | | Percent Zn | Percent Cu | |
| 30 | 1200 | ¼ | 23.18 | 76.82 | Traces of alloying. |
| 60 | 1400 | ½ | 28.16 | 71.84 | Incomplete Alloying. |
| 60 | 1400 | ¼ | 25.04 | 74.96 | Complete Alloying. |
| 30 | 1450 | ¼ | 26.77 | 73.33 | |
| 25 | 1500 | ¼ | 25.86 | 74.14 | |
| 30 | 1500 | ¼ | 21.77 | 78.23 | Zinc Distillation. |
| 60 | 1650 | ¼ | 12.83 | 87.17 | Do. |

The tests of Example I and other tests of like nature have shown that the reduction temperature is rather critical, in that too low a temperature fails to effect complete alloying and reduction of the zinc oxide while too high a temperature produces undesirable losses of zinc by distillation. Temperatures between about 1400° F. and 1550° F. provide reduction rates and recoveries which appear to be commercially desirable. The tests also indicate that the thickness of the layer which is being reduced is a factor since thick layers require a longer reduction time. Layers about ¼" thick are preferred because with such thickness the reduction can be completed at lower temperatures in shorter times, and with good recoveries. Thinner layers may be used also, of course. The tests indicate that the rate of reduction is a function also of the rate of flow of hydrogen. We have found that rates of between about 2 and 20 cubic feet per minute measured at room temperature are effective without being wasteful, although rates between about 2 and 10 cubic feet per minute are preferred for economic reasons. It will be recognized by those skilled in the art that the factors of rate of flow, temperature, time, and layer thickness are all interdependent, and that therefore many combinations of these factors can be employed within the limits set out generally above, to accomplish the purposes of the invention.

In similar reduction tests where larger proportions of zinc oxide were used, it was found that brass powders containing more than about 30% zinc could not be produced.

Example II

In a series of tests made under conditions similar to those of Example I, a part of the fine zinc oxide was intimately mixed with all of the copper oxide. The balance of the fine zinc oxide was spread evenly over the bottom of the tray and was then covered with the copper oxide-zinc oxide mixture. The ratio of total copper to total zinc in each tray was maintained at 70:30, but the ratio of copper to zinc in the top layer of each tray was less, the ratios varying from 70:30 to 70:1. It was found that soft brass powders could be obtained in this way and that the recovery of zinc was increased somewhat, especially where the bulk of the total zinc oxide was in the bottom layer.

In similar tests where no zinc oxide was incorporated in the top layer it was found that the copper oxide was reduced first and that the zinc distilled up into the copper layer and formed a hard brass layer that could not be milled into powder. These tests indicate that when the zinc oxide is mixed with the copper oxide, it aids in keeping the individual particles of reduced metal from sintering or otherwise agglomerating together to form coarse hard lumps. The presence of zinc oxide in the copper oxide thereby makes it possible to obtain the reduced metal in the form of finely divided brass powder. For this purpose it may be desirable to leave a small amount of unreduced zinc oxide in the charge, and if necessary, to remove the unreduced residue from the brass powder after the latter has been removed from the furnace. Such a separation of zinc oxide from the brass powder can be made conveniently in air classifying apparatus of conventional design.

While the foregoing examples have been explained in connection with the production of high-zinc brass powder, it will be recognized that low-zinc brass powder may be made equally well by adjusting the ratio of copper to zinc to produce the desired brass composition.

We have found, however, that it is difficult to produce brass powders containing much less than 10% zinc if complete reduction of the zinc oxide is effected, because at the temperatures involved in the practise of this invention, the particles of low-zinc brass tend to agglomerate into coarse lumps which are difficult to mill into powder. However, if the reduction is controlled so that a part of the zinc oxide remains unreduced, this harmful agglomeration of the brass particles can be minimized, and brass powders containing upwards of about 4% of zinc can be produced. The unreduced zinc oxide can be removed from the finished powder by conventional air separation methods as already noted above.

As indicated previously other gaseous reducing agents besides hydrogen can be used to effect the reduction of the copper and zinc oxides to make brass powder. Carbon monoxide is very suitable, as are mixtures of carbon monoxide with hydrogen in all proportions. Methanol is also an effective reducing agent since it decomposes at elevated temperatures into carbon monoxide and hydrogen. City gas containing more than about 25% hydrogen and practically free of carbon dioxide, is also effective. Hydrocarbon vapors, such as those of methane, propane or butane are not too satisfactory because of their tendency to crack at elevated temperatures with the formation of free carbon. However small to substantial amounts of these latter vapors in city gas, for example, are useful, as are the pure hydrocarbon vapors, where provision is made to separate any precipitated carbon from the brass powder, as by use of an air classifier.

It will be recognized that the basic reactions involved in the reduction of copper oxide and zinc oxide are the following:

1. $ZnO + H_2 \rightarrow Zn + H_2O$
2. $CuO + H_2 \rightarrow Cu + H_2O$
3. $ZnO + CO \rightarrow Zn + CO_2$
4. $CuO + CO \rightarrow Cu + CO_2$ Reactions 1 and 3 are easily reversible at elevated temperatures whereas 2 and 4 occur predominantly toward the right. It is this difference which is primarily responsible for the early reduction of copper oxide, followed later by the reduction of zinc oxide, since the reduction of copper oxide will continue rapidly toward the right even in the presence of considerable concentrations of water vapor and/or carbon dioxide. On the contrary, only small concentrations of these products can reverse reactions 1 and 3 so as to reoxidize any zinc that may be present. As a result the zinc oxide remains unreduced practically until water vapor and carbon dioxide are no longer generated by reactions 2 and 4. At that time, if the flow of gaseous reducing agent is sufficiently rapid, reactions 1 and 3 begin to occur in the forward direction, and continue as long as the flow of the reducing agent is rapid enough to sweep the water vapor or carbon dioxide away as it is generated. If the rate of flow is too slow to accomplish this, so that harmful concentrations of water vapor or carbon dioxide are permitted to develop in the atmosphere around the charge then such concentrations may reach the point where reactions 1 and 3 occur at a greater rate in the reverse direction than in the forward direction, and reoxidation occurs.

It will be recognized that the equilibria of reactions 1 and 3 are altered appreciably by the presence of metallic copper in the layers at the time that the zinc oxide is being reduced, since the reduced zinc alloys with the copper and is thereby removed, in a sense, from the zone of reaction, whereby the effects of mass action favor the occurrence of reactions 1 and 3 in their forward directions.

It will be appreciated from what has been said above that water vapor and carbon dioxide are harmful ingredients in the gaseous reducing agent, and should be kept at low concentrations in the agent when the latter is introduced into the muffle. Preferably the agents should be dried before being admitted to the furnace, and treated with absorbents or by other known means to remove carbon dioxide, if harmful amounts of water vapor and carbon dioxide are present. It will be understood also that the movement of the reduction charge through the furnace should preferably be counter-current with respect to the flow of the gaseous reducing agent in order to minimize reoxidation reactions. When a continuous reduction of a mixture of oxidic zinc and copper compounds is desired with counter-current movement, as by conveying the charge through the furnace on a belt moving in a direction opposite to the flow of the reducing agent, provision should be made for the preliminary calcination of such compounds as the hydroxides, carbonates, and basic carbonates of zinc and copper, to ensure that the water vapor and/or carbon dioxide of these compounds is liberated well in advance of the zone in which the reduction of zinc oxide occurs, since otherwise the products of calcination would promote re-oxidation of the zinc. These oxidic compounds are converted at relatively low temperatures (below about 350° C.) into the corresponding oxides, so that the calcination would normally be completed long before the reduction temperature of zinc oxide would be reached.

The brass powders made in accordance with this invention are easily milled to the desired mesh sizes after they are removed from the reduction furnace. As a consequence the sized powders are retained in a soft, un-work-hardened condition, and may be briquetted with the relatively low pressures of 10 to 30 tons per square inch to produce compacts or briquettes which show good "green strength." The compacts may be sintered at temperatures around 1450° F., preferably in a dry hydrogen atmosphere, and for about 15 minutes, to produce dense bodies. The sintered bodies have been found to exhibit considerably less shrinkage during sintering than comparable brass powder briquettes produced from powder made by atomization of molten brass.

LEACHING

It is, of course, known that metallic copper can be dissolved in ammoniacal solutions containing a cupric compound, as disclosed by Benedict in United States Patent 1,131,986. We have found, however, that metallic zinc, or zinc in alloyed condition with copper as in brass, can be dissolved in ammonium carbonate solutions. We have also found that if metallic copper is present with the metallic zinc, or that if one attempts to dissolve zinc out of brass, some copper is dissolved also, particularly if the solution is aerated while the leaching is going on. It appears that an ammonium carbonate solution, without aeration, will dissolve metallic zinc rapidly and in volume, but will dissolve metallic copper only very slowly. If the solution is aerated, however, its effectiveness as a lixiviant for both metallic zinc and copper is improved. In the case of metallic copper, this improvement appears to result from the oxidation effects of aeration on any copper salts which are in solution, rather than from any appreciable effects on the ammonium carbonate. Apparently some small amount of copper is dissolved at first by the carbonate solution, and aeration oxidizes the dissolved copper to the cupric state. The cupric ammonium carbonate solution then becomes the principal solvent for copper concomitantly being reduced to the cuprous state. Continued aeration then regenerates the cupric salt and thereby assists it in building itself up in the solution.

The action of ammonium carbonate solutions on brass is somewhat different than on the separate metals in that an ammonium carbonate solution without aeration will dissolve both zinc and copper concurrently from brass. The action, however, is accelerated by aeration, and is enhanced more in respect to copper than in respect to zinc.

Figure 2:
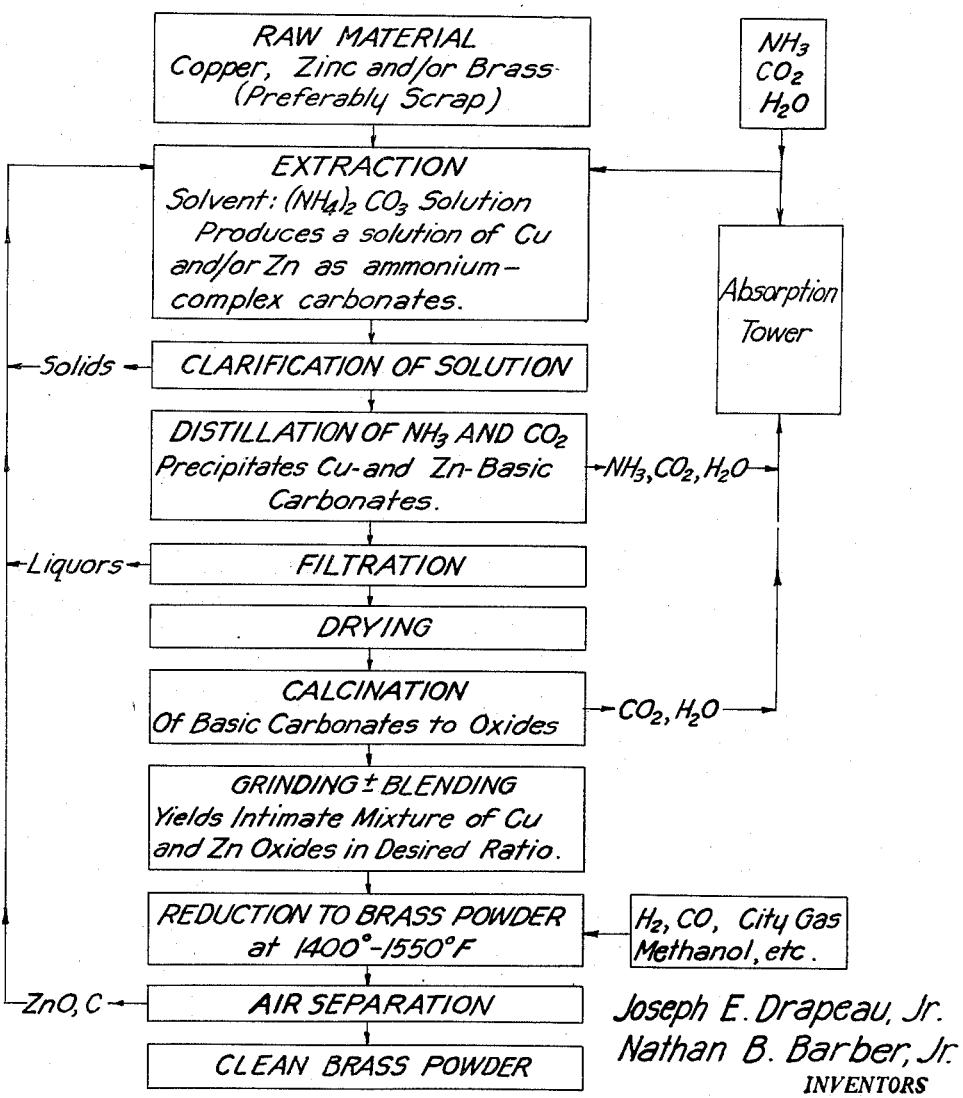
Figure 2 is a flow sheet indicating one type of metallurgical process by which copper and zinc, or brass may be converted into brass powder.

On the basis of these discoveries we have found it possible to leach brass, metallic zinc, metallic copper, or mixtures of metallic zinc and metallic copper, with ammonium carbonate solutions, preferably with aeration, thereby to obtain carbonate solutions of either or both of the metals. The metal values of the carbonate solutions can subsequently be recovered principally in the form of basic carbonates by a simple evaporation or distillation process in which ammonia and part of the carbon dioxide and water of the solutions is driven off by boiling the solution at normal or reduced pressures. By such a distillation the basic carbonates are precipitated from the liquid and can be filtered off. Preferably they are then dried and calcined to convert them to the corresponding oxides, after which the resulting oxides can, if necessary, be mixed with other materials containing zinc or copper or both to provide a suitable copper-to-zinc ratio. The mixture may then be ground to insure a uniform distribution of fine zinc oxide through the copper oxide. The uniform mixture may then be reduced to brass powder by the method already explained hereinabove. The flow sheet of Figure 2 of the drawings indicates the type of process which is involved, and indicates one preferred arrangement in which recycling of intermediate products is employed to attain an efficient process.

The leaching process may be understood more fully from the following examples of Table II, wherein zinc, copper, brass, and mixtures of metallic zinc with metallic copper were treated with ammonium carbonate solutions with and without aeration, and solutions analyzed to determine how much of each of the metals had been dissolved. All the results have been determined at approximately room-temperature conditions.

TABLE II

| Example No. | $(NH_4)_2CO_3$ Concentration g./l. | Duration of Leach Hrs. | Agitation | Aeration | Solution Analysis | |
|---|---|---|---|---|---|---|
| | | | | | Zn (g./l.) | Cu (g./l.) |
| 1. Zn | 80 | 20 | No | No | 60 | |
| 2. Cu | 100 | 3 | Yes | No | | 2.3 |
| 3. Cu | 100 | 19 | Yes (3 hrs.) | Yes (16 hrs.) | | 97.8 |
| 4. Zn | 80 | 16 | Yes (6 hrs.) | No | 32.9 | |
| 5. Zn | 80 | 16 | No | Yes (6 hrs.) | 54.9 | |
| 6. Zn+Cu | 80 | 16 | Yes (6 hrs.) | No | 43.0 | 0 |
| 7. Zn+Cu | 80 | 16 | No | Yes (6 hrs.) | 37.0 | 27. |
| 8. Brass (65:35) | 80 | 16 | Yes (6 hrs.) | No | 11.3 | 16.6 |
| 9. Brass (65:35) | 80 | 16 | No | Yes (6 hrs.) | 15.8 | 20.9 |

From Example 8, it will be appreciated that when brass, preferably in such comminuted form as brass turnings or borings, is leached with an ammonium carbonate solution under the conditions indicated, the resulting solution contains copper and zinc in the ratio of about 1.5 to 1. If aeration is provided, however, as in Example 9 the ratio of copper to zinc can be raised to approximately 1.9 to 1; that is, to approximately the ratio of copper to zinc in the 65:35 brass. If either solution were to be treated in the manner explained above to precipitate the metals as a mixture of basic carbonates, and the mixed carbonates were then to be reduced in the manner also explained previously to produce, say 75:25 brass powder, then copper in some form would have to be added to the mixture in order to bring the ratio of copper to zinc up to slightly less than 3 to 1 to compensate for small vaporization losses of zinc. The additional copper could be introduced in the form of copper powder which could be mixed with the basic carbonates before or after the latter had been calcined. Or the copper necessary to raise the ratio could be obtained in solution by a leaching step of the type shown by Example 3. Such a solution could be blended with the solutions obtained by Examples 8 or 9 in proportions necessary to establish the proper copper-to-zinc ratio, or the copper content of the solution of Example 3 could be precipitated, and the precipitate blended in suitable proportions with the precipitate obtained from Examples 8 or 9. Of course, copper oxide could also be blended with the latter precipitates for the same purpose. In like manner, if conditions arose which required the addition of zinc to the reduction charge, such zinc could be obtained by treatments illustrated by Examples 1, 4, 5 and 6, or could be introduced to the charge in the form of zinc oxide. In summary, therefore, it will be recognized that the step of adjusting the copper-to-zinc ratio may occur at various stages in the process in advance of the reduction step, and that the adjustment may be made with solutions of zinc and/or copper, with oxidic compounds of zinc or copper, or with metallic copper powder.

The leaching process may be applied to many different metallic and non-metallic materials to recover their copper and/or zinc contents for conversion to brass powder. Brass of almost any zinc content may be used alone or in combination with zinc or copper or any of the following materials. Leaded brasses are suitable since the ammonium carbonate solutions do not extract the lead, tin or iron contents of brasses. For the same reason bronzes and copper-lead aggregates may be treated to recover their copper. Likewise copper-plated iron may be treated for copper, and copper-plated zinc electrotype plates may be processed to recover either the copper or the zinc or both. However, in treating materials containing lead, tin or iron, some of these metals appear in the leach liquor in a colloidal condition, and should be removed from the latter before the copper and zinc basic carbonates are precipitated in the evaporation or distillation step, supra. Copper or brass containing cobalt, nickel or silver should be avoided unless these latter metals can be tolerated in the brass powder, since they are all dissolved to some extent by the ammonium carbonate solutions. Crude nonmetallic materials such as zinc fume, or blue powder may be used. It is apparent, of course, that the use of scrap or secondary materials of the kinds mentioned is preferred for economic reasons, but the practise of the invention is not limited to their use.

A wide range of concentrations of ammonium carbonate may be used, depending on the economics of the process, but for most purposes a concentration of between about 40 to 80 grams per liter is preferred. Concentrations higher than about 80 grams per liter can dissolve so much copper that they may become saturated in copper-ammonium-complex salts, and may produce troublesome crystallizations of these salts which clog up the equipment, coat the metal which is being leached, and otherwise impede the leaching process. Concentrations less than about 40 grams per liter may be economically undesirable because of the slower rates of dissolution. A concentration of about 60 grams per liter is preferred because it appears to provide a satisfactory compromise between these technological and economic limitations for commercial practise of the invention.

Many modifications of the invention as herein described are within the ability of those skilled in the art, and such modifications as come within the scope of the claims are contemplated as part of the invention. For example, while relatively thin layers of charge are preferred in the reduction process for the reasons noted, it is possible to reduce relatively thick beds of charge by employing a revolving reduction furnace, or a furnace in which the charge can be suitably rabbled to bring unreduced portions of the charge into effective contact with the reducing agent. Furthermore, while scrap brass and other scrap metals containing copper and zinc are preferred raw materials for the leaching process, numerous other secondary materials besides those mentioned previously are available and may be used with or without previous beneficiation as a source of zinc and/or copper recoverable by leaching with ammonium carbonate solutions. Various other details of the invention are likewise subject to modification in accordance with abilities of one skilled in the art, when guided by the foregoing disclosure of the concepts and practise of the invention.

The foregoing leaching processes are described and claimed in our copending divisional application Serial No. 304,534, filed August 15, 1952.

Having described the invention what is claimed is:

1. The method of producing soft, alloyed brass powder which is composed essentially of between about 4% and 30% of zinc, balance copper, and which is particularly adapted for use in making briquetted bodies having good green strength and good sintering properties, said process comprising the steps of: subjecting to reduction at temperatures between about 1400° F. and 1550° F. and in a flowing stream of gaseous reducing agent a loose, unconsolidated, shallow layer consisting essentially of an intimate mixture of zinc oxide having a particle size below about 10 microns and at least one finely-divided cupriferous material selected from the group consisting of metallic copper and oxidic copper compounds, the zinc oxide and cupriferous materials being proportioned in said layer to provide (a) zinc and copper contents therein in about the proportions required in the desired brass powder, and (b) to provide an excess of zinc oxide thereover in an amount as hereinafter specified; continuing the reduction until any oxidic copper compounds have been reduced to metallic copper and until the major part of the zinc oxide has been reduced, but discontinuing the reduction while sufficient unreduced zinc oxide remains in the layer to effectively maintain the entire mass thereof in a powdery, substantially unsintered condition; cooling the layer under nonoxidizing conditions, and thereafter separating the unreduced zinc oxide and recovering brass powder from said cooled mass.

2. The process as claimed in claim 1 wherein the shallow layer has a thickness of about ¼ inch, and wherein said gaseous reducing agent is hydrogen.

JOSEPH E. DRAPEAU, Jr.
NATHAN B. BARBER, Jr.

References Cited in the file of this patent
UNITED STATES PATENTS

| Number | Name | Date |
|---|---|---|
| 827,717 | Edison | Aug. 7, 1906 |
| 1,741,953 | Ramage | Dec. 31, 1929 |
| 1,829,635 | Davey | Oct. 27, 1931 |
| 1,875,722 | Gabriel et al. | Sept. 6, 1932 |
| 1,908,696 | Dodge | May 16, 1933 |
| 2,133,761 | Tietig | Oct. 18, 1938 |
| 2,254,976 | Powell | Sept. 2, 1941 |